June 30, 1942.   C. C. SCHAEFER ET AL   2,288,031
FEED MECHANISM
Original Filed June 10, 1939   6 Sheets-Sheet 1

INVENTORS:
Charles C. Schaefer, Soren A. Tollefson
& Herman F. Died,
BY Paul & Paul
ATTORNEYS.

June 30, 1942. C. C. SCHAEFER ET AL 2,288,031
FEED MECHANISM
Original Filed June 10, 1939  6 Sheets-Sheet 2

WITNESSES:

INVENTORS:
Charles C. Schaefer, Soren A. Tollefson
& Herman F. Mead,
BY
ATTORNEYS.

June 30, 1942.  C. C. SCHAEFER ET AL  2,288,031
FEED MECHANISM
Original Filed June 10, 1939   6 Sheets-Sheet 5

WITNESSES:
Thomas W. Kerr Jr.
George L. Conely

INVENTORS:
Charles C. Schaefer, Soren A. Tollefson
& Herman F. Nied,
BY Paul & Paul
ATTORNEYS.

Patented June 30, 1942

2,288,031

UNITED STATES PATENT OFFICE 2,288,031

FEED MECHANISM

Charles C. Schaefer and Soren A. Tollefson, Oaklyn, and Herman F. Nied, Camden, N. J.

Original application June 10, 1939, Serial No. 278,574. Divided and this application September 19, 1941, Serial No. 411,460

15 Claims. (Cl. 214—8.5)

This invention relates to feed mechanism and, more particularly, to the type whereby a stack of articles, such as thin discs, may be removed from a magazine and differentially coated with silver and carbon to vary the ohms resistance capacity. Specifically, the subject matter comprehended herein is a division from the application for patent filed by the instant inventors on June 10, 1939, under Serial No. 278,574; allowed March 20, 1941, and which has matured into Patent No. 2,259,588, dated October 21, 1941.

The primary object of this invention is to provide a machine as typified in the noted prior application, wherein the discs are transported by a continuously moving conveyor characterized by novel means for concurrently feeding in the successive discs without stoppage of said conveyor Other objects of a tributory character in addition to ancillary advantages achieved by this invention will be apparent from, or specifically noted in, the following description; and it may be said to essentially comprise the elements and combinations of the same, features of construction, and arrangements of parts that are typically shown in the preferred embodiment illustrated by the accompanying sheets of drawings, and the scope of application whereof is more particularly defined in the concluding claims.

In the drawings:

Fig. 14 is a fragmentary elevation and part sectional view on the staggered plane XIV—XIV of Fig. 6, but drawn to a smaller scale.

Figs. 15 and 16 are fragmentary views similar to Fig. 14, but showing different positions of the disc ejector member in moving the consecutive discs from the magazine into position for application to the conveyor carrier elements; and, Fig. 17 is a plan section, taken approximately as indicated by the arrows XVII—XVII in Fig. 6, and showing suitable pneumatic devices for blowing the successive discs from the transfer means onto an opposing carrier element with a disc in position on said carrier element.

Figure 1:
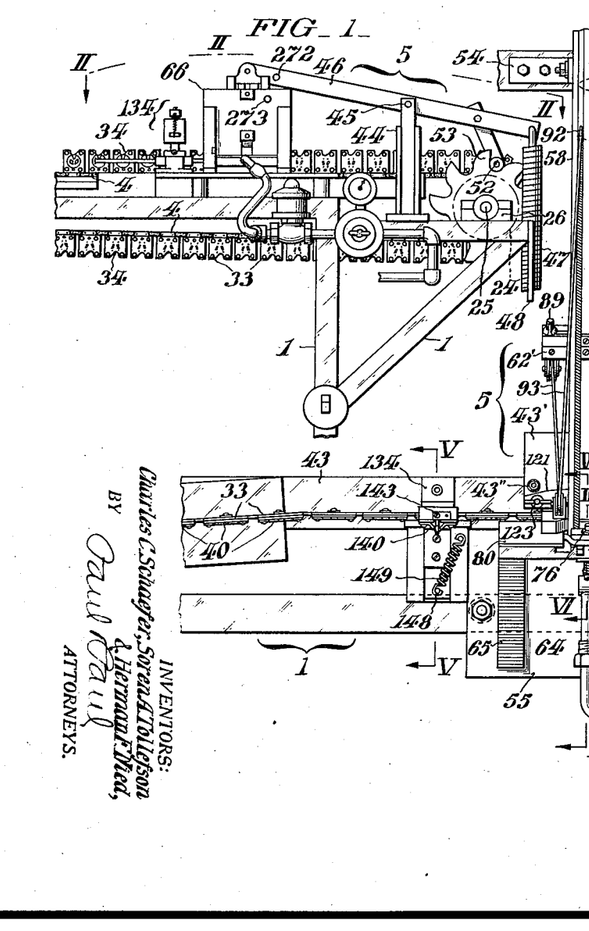
Fig. 1 is a fragmentary side elevation of a portion of the machine illustrated in the above identified application for patent and preferably adapted for applying resistance deposits to rheostat discs for use in radio volume control units and embodying the improved feed mechanisms of this invention.

In the illustrated embodiment of this invention as preferably adapted to the application of resistance deposits of predetermined areas and density to rheostat discs for radio volume control units, corresponding reference characters are employed to those used in the referred to prior application for facility in understanding; and as therein set forth, the machine comprises a framework 1, for a continuously operable conveyor 4, and a magazine with feed mechanism comprehensively designated 5. The endless conveyor 4 is driven by a sprocket 24 on a transverse shaft 35, journaled in bearings 26, at the "feed" end of the machine, or right-hand of Figs. 1 and 2. The chain 23 of the conveyor 4 as described in the hereinbefore referred to application comprises conventional spaced links 30 with alternating rectangular plate or somewhat T-section components 31 along one side thereof, as best appreciated from Figs. 6 and 10, said components 31 being of greater depth than the width of the links 30, as best shown in said figures. To each components 31 is affixed, as by a set-screw 32, a rectangular carrier 33 having an undulate recess 34 in the upper part, and outset opposedly inclined lugs 35, preferably constituted by the flanges of channel section elements 36, best seen in Fig. 10, clamped thereto by set-screws 37, with said flanges engaged through complemental slots in the carrier 33, so as to ensure against relative movement. These flanges or lugs 35 serve to engage through apertures 38, Fig. 8, and grip the tapering central part 39 of the rheostat discs 40 to support the latter.

Figures 6, 7, 8, 9:
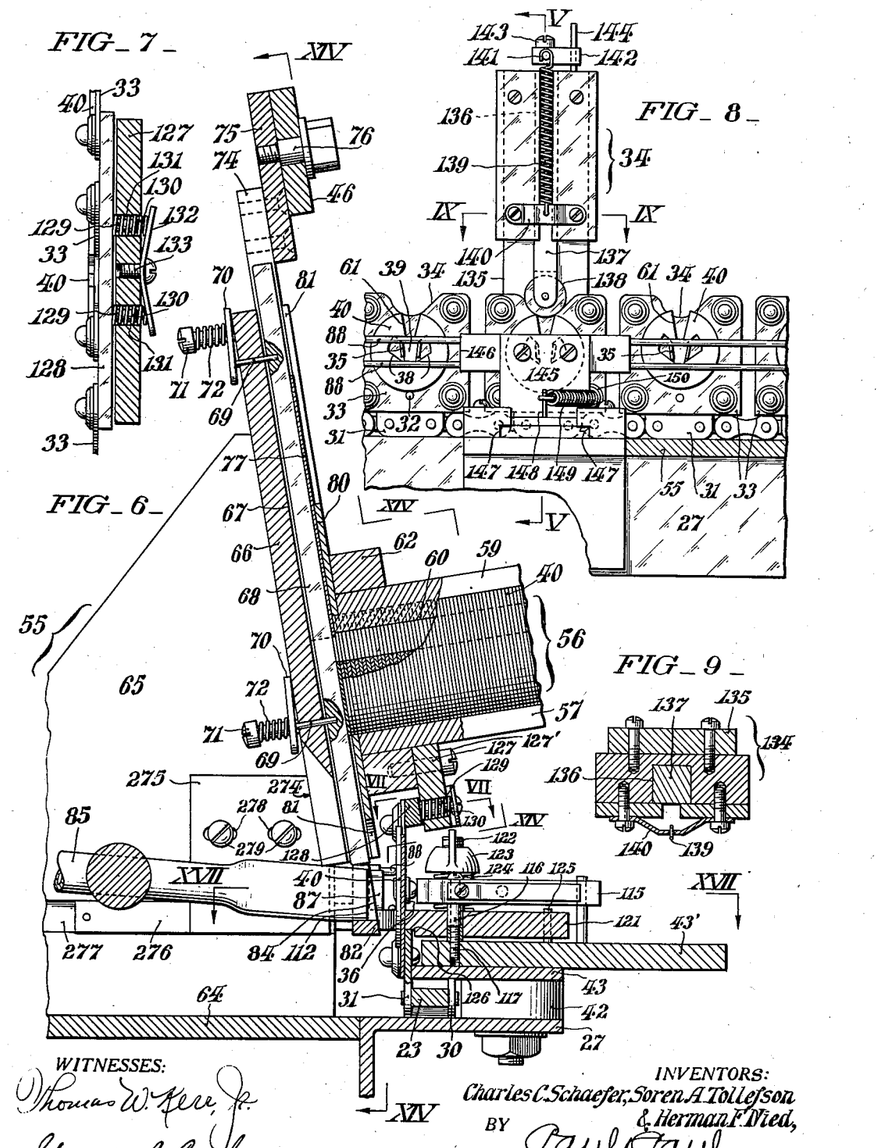
Fig. 6 is a fragmentary sectional elevation, within the limits of the arrows VI—VI in Fig. 2, or through the feed portion of the disc magazine, drawn to a larger scale for better illustration how successive discs are initially removed from the magazine for transfer into registration with conveyor carrier elements.
Fig. 7 is a fragmentary section, on the plane VII—VII in Fig. 6, hereinafter fully explained.
Fig. 8 is a fragmentary elevation as viewed from the left-hand and looking towards the right of Fig. 5.
Fig. 9 is a section on the plane IX—IX of Fig. 8.

To prevent the active flight of the conveyor 4 from lifting as well as to positively ensure its aligned progression along the track 27, Fig. 6, in respect to the feed mechanisms 5 of this invention, said track is fitted at regular intervals of its length with appropriate spacers 42, and a member 43 paralleling such track. This member 43, in conjunction with the track 27 jointly afford smooth guidance for the conveyor links 30 with the T-section components 31 riding along the edge of member 43, as clearly understandable from Figs. 3, 6 and 10, more particularly.

Figure 2:
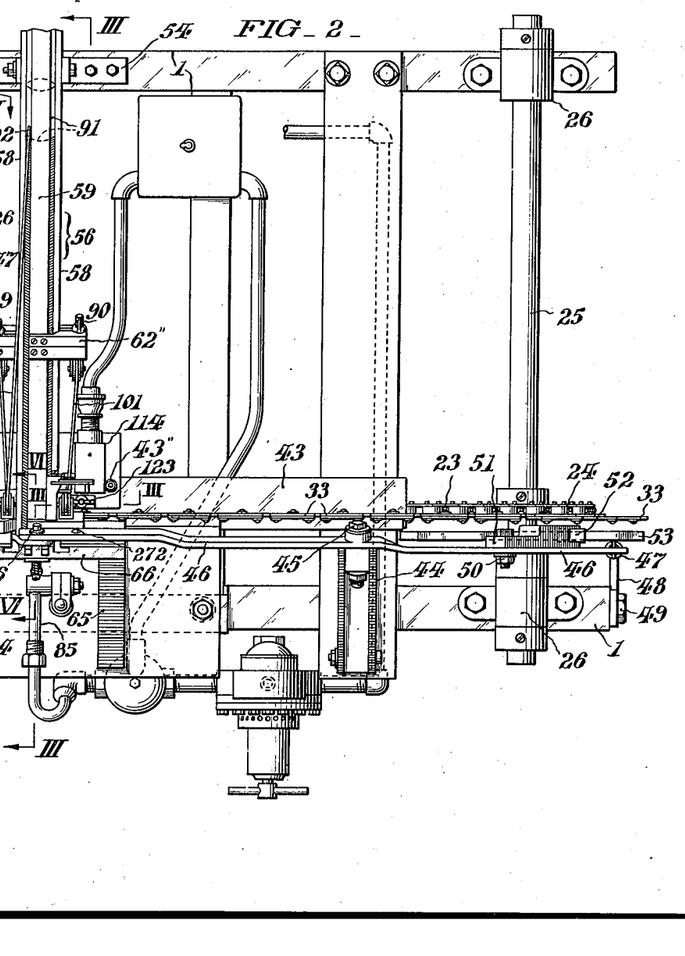
Fig. 2 is a top plan view within the confines of the plane indicating arrows II—II of Fig. 1, also drawn to a larger scale for clearer illustration of important details.

Mounted on the framework 1, proximate the feed end of the machine, is a rigid fulcrum bracket 44 having pivoted thereto at 45 an actuator lever 46 to the outer end of which is connected one extremity of a recoil spring 47 having its other end coupled to a suitable anchor 48, secured at 49 to the end of the framework 1. Fixed to the actuator lever 46, with capacity for adjustment as by appropriate clamp means 50, Fig. 2, is a pawling element 51 having an antifriction roller 52 at its free end, in turn coactive with a tooth cam 53 fast on the shaft 25, whereby the lever 46 is rocked on its pivot 45 in opposition to the spring 47, for a purpose later explained.

Spanning the framework 1 and attached thereto by spaced brackets 54 and a foot structure 55, Figs. 2, 3, 4 and 6, is the magazine and feed mechanism 5. This mechanism comprises an inclined chute 56 including a bottom bar 57, Fig. 14, side bars 58 and a top bar 59 having an inwardly directed rib 60 for coaction with the V-notch 61 of the rheostat discs 40. The bars 57, 58 and 59 are secured in relative assembly, to afford smooth guidance for a column of rheostat discs 40, by connecting collars 62 with screws 63, Fig. 3, in an obvious manner, to ensure accurate parallelism and alignment; while the lower end collar 62 preferably forms part of the foot structure 55, as best understood from Figs. 3 and 6. The foot structure 55 embodies a base 64 with spaced uprights 65 and a relatively adjustable spanning wall 66, Figs. 3, 4 and 6, said wall being disposed at right angles to the longitudinal inclination of the chute 56 and having spaced grooves 67 therein for wear bars 68 which are influenced towards the discharge end of said chute by socketed pins 69 under the action of pushers 70 afforded guidance by adjustable screws 71, and having springs 72 in compression intermediate the head portions of said screws and the outer face of the pushers 70. It is to be here noted that the socketed pins 69, carried by the wear bars 68, are of such a length to normally project beyond the outer surface of the connection wall 66 so as to hold the pushers 70 inclined relative to said surface, as clearly shown in Figs. 3 and 6. In addition to the grooves 67 in the foot piece spanning wall 66, the latter has flanking other grooves 73, Figs. 4 and 14–16, affording guidance for slide bars 74 connected together at the upper ends by a tie piece 75, and to which the inner end of the actuator lever 46 is pivotally connected by a shouldered stud 76. Also bridging and rigidly secured to the slide bar 74 is an ejector plate 77 of appropriate thickness to remove the successive rheostat discs 40 from the chute 56, as hereinafter set forth; while it is to be particularly observed the ejector plate 77 is provided with an arcuate cut-out 78 and central tongue 79 adapted to jointly coact with the rheostat disc circumferential edge and V-notch 61 respectively, Figs. 15 and 16, to effectively prevent displacement or turning movement of the discs 40 during removal from the chute 56; and 80 is a face plate secured to the spaced uprights 65 for retaining the wear bars 68 and slide bars 74 in their respective grooves 67 and 73, said face plate having a cut-out 81, Figs. 3, 6 and 10, accommodating reciprocative clearance for the slide bars 74 and tie piece 75.

Arranged below the ejector plate 77 and associated parts is a disc receiver and temporary holder conveniently in the form of a bar 82 having a longitudinal rib 83 and an inclined interruption or recess 84 in confronting juxtaposition to an air nozzle 85, as well as in spacial relation to the successive conveyor chain disc carriers 33, as later on again referred to. As will be best understood from Figs. 10, 11 and 17, inclusive, the interruption 84 defines sectoral edges 86, on which the lower circumferential edge of each consecutive disc 40 released by the ejector plate 77 temporarily rests and is so held by a suitably contoured or undulate spring 87. In addition the bar 82 is also provided with paralleling flexible wires 88 functional to hold the discs 40 against the carrier 33 until effectively held thereagainst by the inclined lugs 35 hereinbefore referred to.

Figure 3:
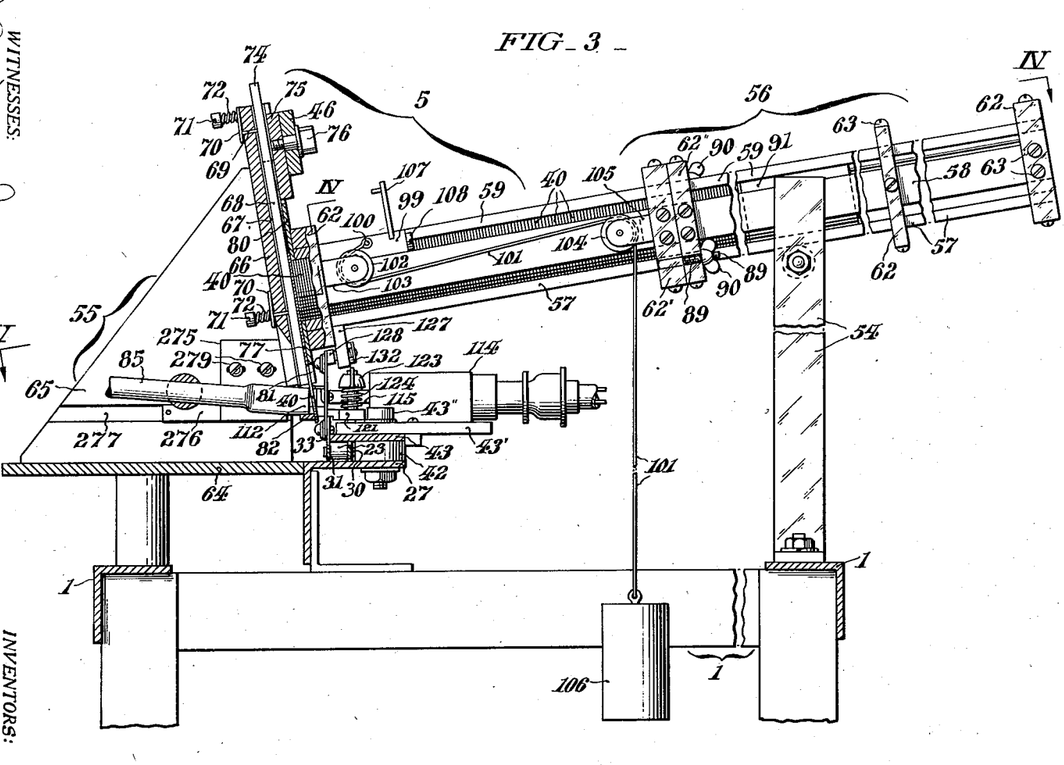
Fig. 3 is a part section and part elevation on the plane III—III in Fig. 2.
Figures 4, 5:
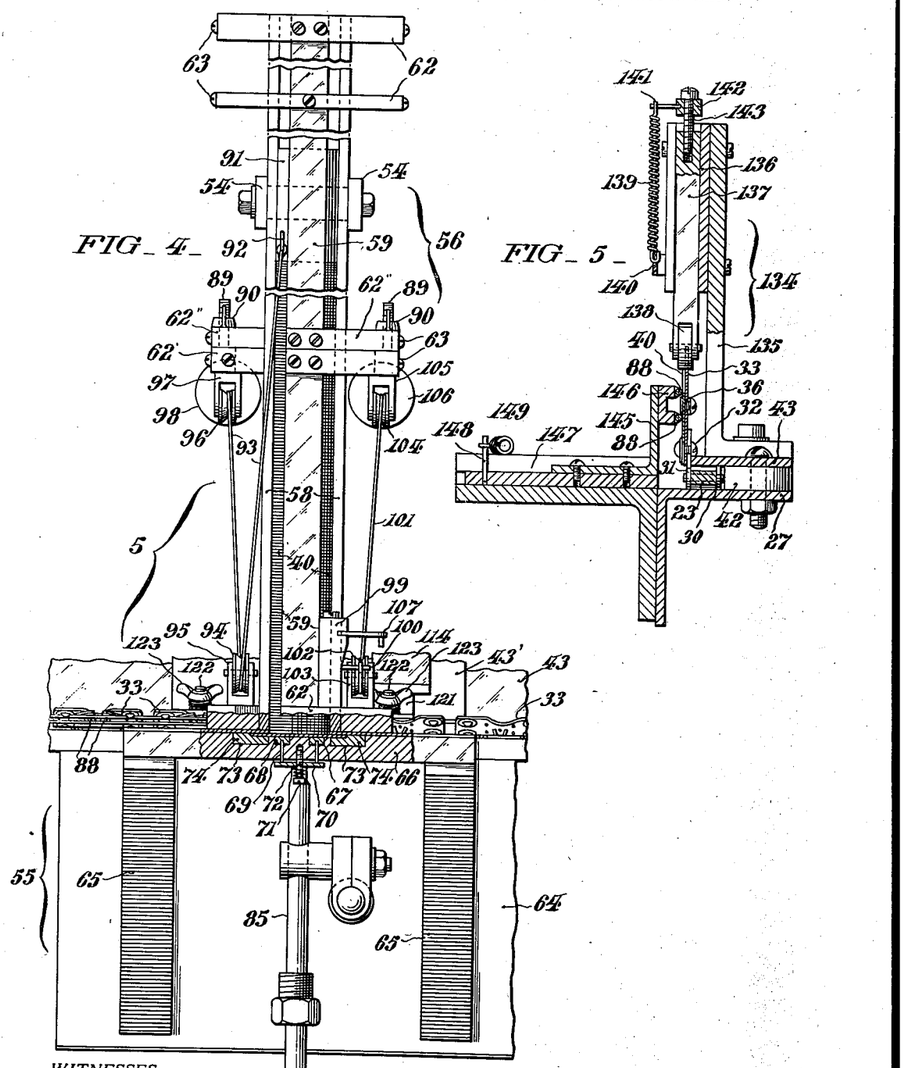
Fig. 4 is a plan section of the disc magazine and mechanism for feeding the successive discs to the conveyor means, said section being taken approximately on the staggered plane IV—IV of Fig. 3.
Fig. 5 is a vertical section on the arrowed plane V—V in Figs. 2 and 8.

In order that the inclined chute 56 may be kept continuously replenished with discs 40, said chute is preferably made in two sections which are connected together by screws 89, with wing nuts 90 respectively secured in and coactive with intermediate collars 62′, 62″, Figs. 3 and 4, with the one section being removable by releasing said nuts 90 and lifting from support by the spaced brackets 54, for refilling with discs 40 when emptied, and replacement in an obvious manner. Slidably fitting the chute 56 is a feed block or follower 91 having a radially projecting hook 92, at one side of the chute 56, to which is attached one end of a flexible cord or the like 93, in turn trained around a freely rotative sheave 94 in a bearing 95 carried by the foot structure 55, and a second sheave 96 in a bearing 97 carried by the collar 62′ and having a weight 98 at its free end. The follower 91 serves to maintain the column of discs 40 compacted towards the lower end of the chute 56 in contact with the wear bars 68.

Figures 14, 15, 16, 17:
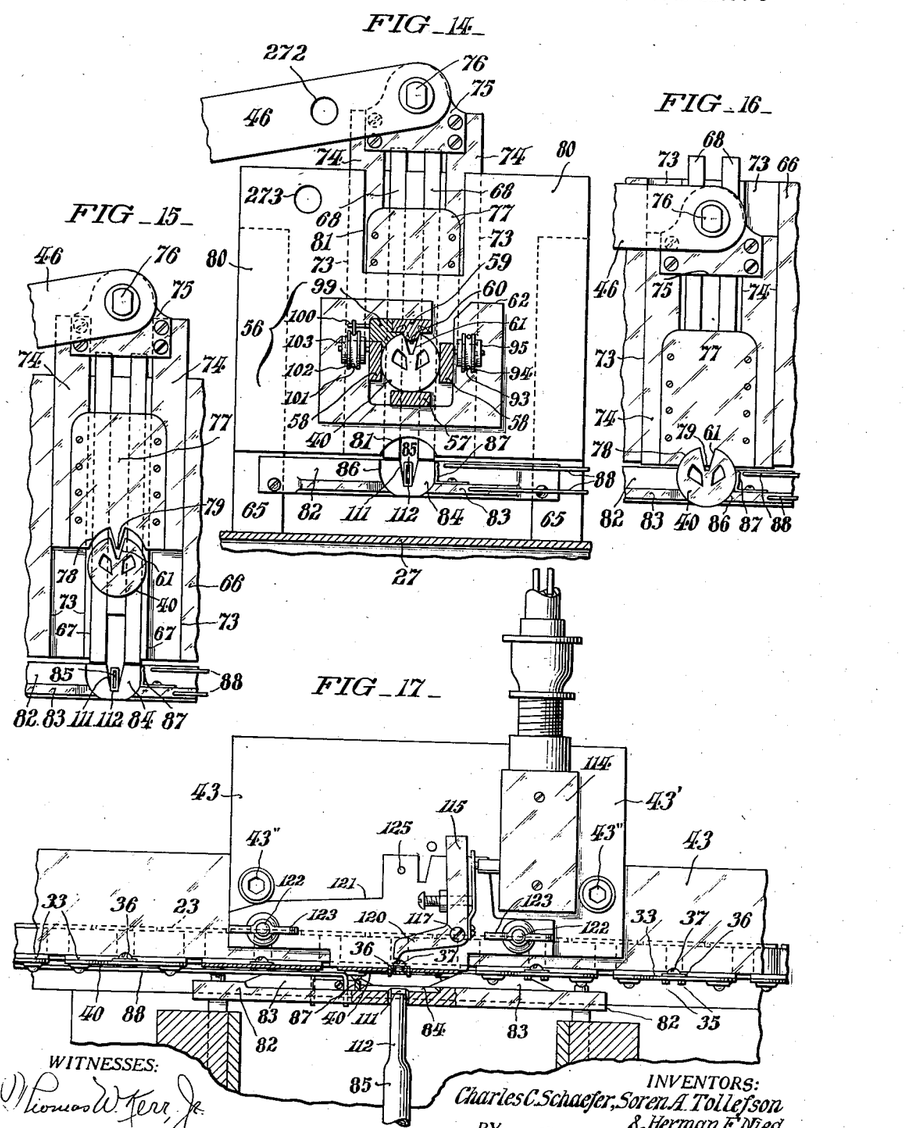

In order that the discs 40 may be constantly held under forward influence towards the wear bars 68 when the upper chute section is removed, as aforesaid, for refilling, there is provided a second "pull-influenced" means at the opposite side of the chute 56 and comprising a block 99 of suitable cross-section to movably coact with one of the chute side bars 58 and the top bar 59 as clearly shown in Fig. 14 This block 99 normally occupies the position shown in Fig. 3, or in abutment with the foot structure 55, and it is provided with a lateral hook or pin 100 to which one end of a flexible cord or the like 101 is attached, while said cord is trained around a sheave 102 carried by a bearing 103 on the foot structure 55 and a second sheave 104 in a bearing 105 on the collar 62' with a weight 106 at its free end. In addition the block 99 is provided with a push-in slide 107 under control of a spring-influenced snap device 108, best shown in Fig. 13. Now it will be readily understood that when the supply of discs 40 passes below the collar 62' the operator slides the block 99 upwards, as viewed in Figs. 3 and 13, for example, and pushes in the slide 107 between the uppermost disc 40 and the bottom face of the follower 91 in opposition to the snap device 108. From Fig. 13 it will be seen the inner end of the push-in slide 107 is chamfered down at 109 to aid its free insertion, as well as having a recess 110 for coaction with the snap device 108 to hold said slide in the active position for feeding the discs 40 forward under influence of the weight 106. Incident to the operation just described, the operator releases the cord 93 from the follower hook 92, whereupon the chute upper section, and follower 91, can be removed by disconnecting the wing nuts 90 from the screws 89 and the said section refilled with discs 40 and the follower 91 replaced and attached to the cord 93 after the upper section is reconnected by the wing nuts 90 and screws 89. Obviously, as soon as the disc replenishment is effected, as just explained the slide 107 is retracted when the weight 106 automatically retracts the block 99 to its normal position in abutment with the foot structure 55, and it will be appreciated that by the means described feeding forward of the discs 40 continues uninterruptedly as long as the machine is in operation.

Figure 10:
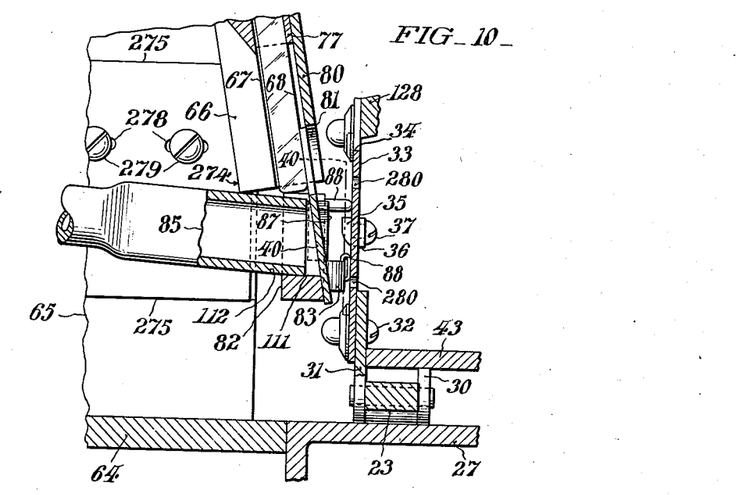
Fig. 10 is a fragmentary sectional view of the lower central portion of Fig. 6, on a larger scale, showing a disc in position ready for projection against a conveyor chain carrier element.
Figures 11, 12, 13:
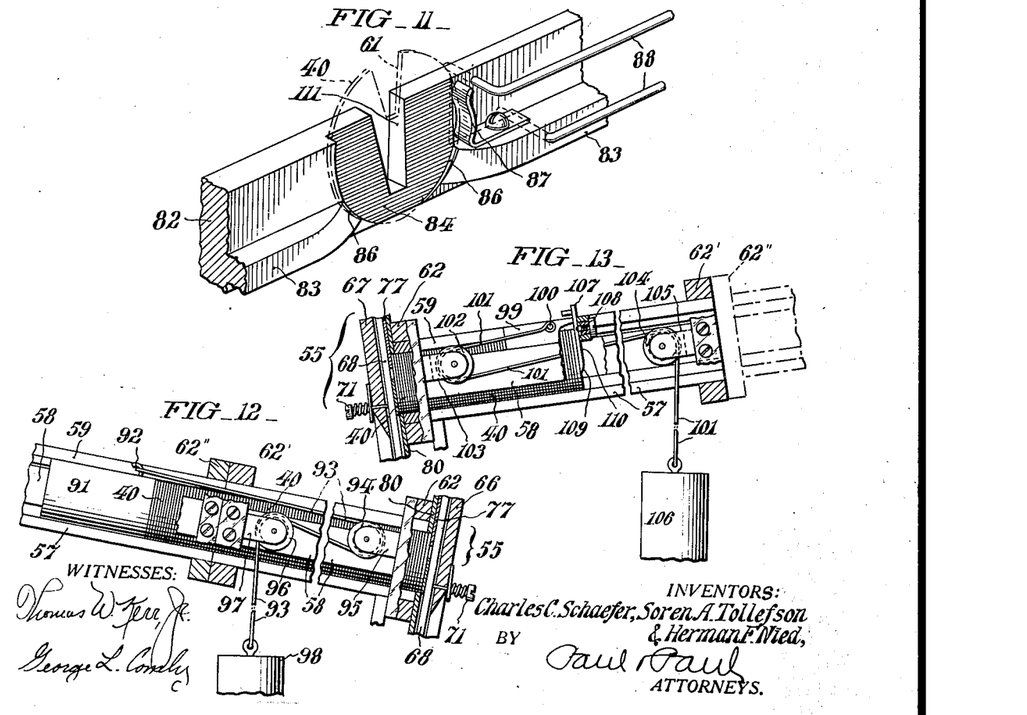
Fig. 11 is a detail perspective view of a retainer means effective for preventing the discs from dropping away from the feed mechanism transfer means.
Fig. 12 is a fragmentary sectional view through the magazine disc delivering end.
Fig. 13 is a similar view to the preceding as seen from the reverse side thereof and with certain movable parts in a different position.

In order to transfer each successively released disc 40 from the inclined recess 84, let it be first remarked the latter is provided with a cut-out 111 into which the laterally collapsed end 112 of the nozzle 85 projects, Figs. 10 and 17, and that such transfer is effected by intermittent blasts of pressure air emitted by said nozzle. The nozzle 85 is under control of a magnetic valve as set forth in the hereinbefore identified prior application of a patent, said valve in turn being actuated by a suitable switch 114, Figs. 3, 6 and 17, intermittently operated by a spring-influenced angle member 115 fulcrumed by a sleeve 116, to a pillar 117, secured in a table plate 43' attached to the member 43 by clamp screws 43'', see Figs. 6 and 17 to best advantage. Pressure air is supplied to the nozzle 85 from any convenient source of supply, not shown; while the magnetic switch 114 is actuated to open and close by a trip portion 120 of the member 115 engaging the head of the set screws 37, hereinbefore referred to, as the conveyor chain 23 progresses.

At this juncture, note is to be had that, in order to keep the conveyor chain 23 from displacement incident to machine vibration or other causes, use is made of a floating plate 121 afforded vertical guidance by the sleeve 116, and spaced pins 122 having their upper ends screw threaded for engagement by wing nuts 123 with interposed springs 124, and another guide pin or pins 125 functional to prevent planar inclination of floating plate 121, said plate having an undercut groove 126 for coaction with the top edge of the special chain links or T-shaped components 31. In addition to the means just described and in order to prevent deflection of the carrier members 33, under influence of the pressure air when transferring released discs 40 to said members, a buffer device is provided, said device comprising a bar 127, see Figs. 6 and 7, which is rigidly fixed by screw studs 127' to the foot structure abutting collar 62 with projection therebelow. Supported by the bar 127 is a buffer member 128 having spaced studs 129 with encircling coil springs 130, housed in holes 131 through said bar, with the opposed ends of said springs engaging a flat adjuster member 132 held in place on the bar 127 by a screw 133. The member 132 is variably flexed to hold the buffer member 128 in such a position that the conveyor carrier members 33 are maintained vertical during successive impacts of the air blasts emitted by the nozzle 85.

In order that the successive discs 40 applied to the consecutive carriers 33 may be firmly retained in position for deposit application and to prevent any rotary movement thereof relative to the inclined lugs 35, use is made of a wedging device seen to best advantage in Figs. 5 and 8, and comprehensively designated 134. This wedging device 134 comprises a vertical bracket 135, secured on the member 43 in proximity to the chute 56, said bracket having guide races 136 in which a slide 137 is movable, while the slide 137 has a freely rotative roller 138 in its lower part, adapted to ride along the top edge of the carrier members 33. This slide 137 is downwardly influenced by a spring 139 anchored at one end to an apertured strap 140 secured across the races 136; and at the other end coupled at 141 to a block 142, vertically adjustable by a screw 143, threadedly engaged in the upper end of the slide 137, and said block 142 is prevented from rotary movement by a guide pin 144 in a clearly apparent manner, while it will be observed the block 142 also serves as a downward movement limiting stop for said slide 137. In combination with the wedging device 134, there is provided a laterally effective pusher or holder 145 for coaction with the wires 88 carried by the bar 82, said holder 145 preferably being in the form of an angle section slide with suitable projections 146 for coaction with the wires 88, and it is guided in appropriate stationary groove means 147. The holder 145 has an anchorage 148 for one end of a retractile spring 149, the other end whereof is attached to a second anchorage 150 projecting from one of the groove means 147, thus it will be seen the holder 145 is constantly influenced towards the wedging device 134 whereby the conveyor chain special components 31 and attached carriers 33 are held vertical during operation of the disc wedging device 134.

Referring again to the magazine and feed mechanism 5, the grooved spanning wall 66 supporting the wear bars 68 and slide bars 74, said wall preferably seats at the sides in edge grooves 274, Figs. 6 and 10, in the spaced uprights 65, and it is provided at the lower portion with flanges 275 having extensions 276 slidable in grooves 277 in said spaced uprights 65. In addition, the flanges 275 have elongated slots 278 through which spaced clamp screws 279 engage correspondingly threaded holes in the uprights 65 whereby provision is made for adjustment of the plane of the wall 66, as well as the disc receiving and holder bar 82, into close proximity and true parallelism with the conveyor chain 23. This provision for adjustment of the holder bar 82 relative to the path of travel of the conveyor chain 23 is of prime importance, inasmuch as it enables prevention of flight "caroming" of the discs 40 from the inclined recess 84 in said bar under influence of the pressure air blast from the nozzle 85. Furthermore, in order to also prevent "pocketing" of air intermediate the disc 40 as it impacts the carrier 33 for engagement by the inclined lugs 35, said carrier is preferably provided with air escape holes 289 (Fig. 10) therethrough, whereby any glancing action of the disc flight, in respect to the carrier 33 is effectively avoided. In other words, by the provisions just described, irregular impacts of the discs 40 against the carrier 33 is prevented, and failure of the disc 40 being automatically engaged by the lugs 35 rendered impossible. It is to be noted the actuator lever 46 is provided with a hole 272 for registration with a corresponding aperture 273 in the connector wall 66 of the magazine and feed mechanism 5, see Figs. 1 and 7; so that when desired the pawling element 51 may be raised out of engagement with the tooth cam 53, by inserting a pin (not shown) into said hole 272 and aperture 273.

The structural features of the invention, as well as the coordinative relationship of the mechanisms having been explained, operation of the feed mechanism 5 and associated wedging device is briefly as follows: When the actuator lever 46 is released so that the roller 52 of the pawling element 51 coacts with the tooth cam 53, whereby the disc feeding ejector plate 77 becomes intermittently activated to successively remove a disc 40 from the inclined chute 56 into the province of the air nozzle 85, it will be readily understood that the intermittent blasts of pressure air emitted by the nozzle 85 alternate in timed relation with the disposal of the consecutively released discs 40, in front of the collapsed end 112 of said nozzle, so that the disc 40 is projected onto the registering carrier 33 for engagement by the inclined lugs 35, during the period of retraction of the ejector plate 77, and its positioning ready to release the next disc 40 from the chute 56. Immediately following the operation just described and, incident to continuous progression of the conveyor chain 23 the carrier 33, with the applied disc 40, passes below the presser roller 138 which forces said disc into gripped relation by the inclined lugs 35 to prevent its oscillation to the right or left hand, as hereinbefore explained.

From the foregoing the invention will be clearly understood and its advantages fully appreciated, and it will also be readily understood a simple and efficient means is provided for carrying out the stated objects of the invention. Still further, although one practical embodiment of the invention has been particularly explained with elements and means preferably adapted to perform the functions set forth, for a specific purpose, it is obvious that various changes in form and other applications of the inventive features may be resorted to, without departing from the spirit or sacrificing any of the advantages of this invention.

Having thus described our invention, we claim:

1. Mechanism for feeding individual elements to a moving conveyor, adapted for continuous progression, and including means for supporting the elements in vertical position, a container for the elements with means urging them toward an outlet orifice, a sustaining means for the elements, a device for ejecting the elements individually through the container outlet and depositing them on an adjacent holder, means operating said device incidental to progression of the conveyor, and the holder embodying a recess for temporary reception of the disc; means to prevent vibratory displacement of the disc from the holder recess; means in juxtaposition to the said holder effective to project the element therefrom into coaction with the conveyor supporting means; a suitably influenced thrust device, in the path of the conveyor active flight operative to push the elements received by the conveyor into grippage by the lateral projections aforesaid; and buffer means constraining the element carrying supports from inclination during the impact caused by the disc ejector.

2. Mechanism as defined in claim 1 further characterized in that the conveyor comprises spaced links with alternating rectangular section carrier components along one side thereof, said components being of substantially greater depth than the width of the spaced links and each having an undulate recess in the upper portion; and downwardly merging lugs project outwards from said carrier components for coaction with a correspondingly tapered approximately central part of the individual elements to be progressed by the conveyor.

3. Mechanism as defined in claim 1 wherein the elements to be fed are in the form of discs, the container therefor and the forwardly urging means comprise a foot structure of spaced uprights with a relatively adjustable spanning wall at an inclination to the vertical; a chute is supported by the spanning wall at an inclination to the horizontal; a reciprocatory ejector plate operates intermediate the foot structure spanning wall and the adjoining end of the inclined chute; weight influenced elements urge the discs towards the chute outlet end and confronting ejector plate; mechanism operative from the conveyor progressing means reciprocates the ejector plate; and means whereby said mechanism may be held out of action during initial progression of the conveyor.

4. A container and feed mechanism, for a continuously progressible conveyor, comprising a foot structure affording rigid support for a container chute inclined to the horizontal to feed consecutive disc elements to the conveyor, said chute consisting of a section rigidly secured to the foot structure and an aligned relatively removable section, adjustable wear elements in the foot structure confronting the chute outlet end, parallel slide bars in the foot structure carrying an ejector member for successive removal of the disc elements from the chute, a weight-influenced follower slidable in the chute and urging the disc elements to its outlet end, an auxiliary weight-influenced follower effective to continue forward urging of the discs after the chute removable section is emptied of discs and detached for refilling, a temporary holder for the discs as consecutively removed from the chute, means operatively coordinating the ejector slide bars to the conveyor progressing means, and a buffer device effective to maintain the conveyor parallel to the disc holder during advancement in parallelism to the latter.

5. A container and feed mechanism, for a continuously progressible link chain conveyor with vertical carrier components along one side thereof, comprising a foot structure embodying spaced walls with grooved edges inclined over from the vertical, a spanning member seated in the grooved edges, said spanning member having flanking flanges shiftable along grooves in the foot structure spaced walls, means for adjusting the plane of the spanning member into accurate parallelism and close proximity to the chain conveyor, a chute inclined to the horizontal and sustained by the spanning member for feeding discs to the conveyor carrier components, said chute including a detachable outer section, adjustable wear bars in the spanning member confronting the chute outlet for sustaining the discs, flanking slide bars in the spanning member with the upper ends connected by a bridge piece, an ejector plate attached across the slide bars and movable therewith for successive removal of the discs from the chute, a main weight-influenced follower slidable in the chute to urge the discs into coaction with the ejector plate, an auxiliary follower movable along the chute with means shiftable into coaction with the outermost disc, when the detachable section of said chute is removed for refilling, a notched holder carried by the spanning member for temporary reception of each consecutively ejected disc with means restraining the disc against rotary movement, pressure medium conductive means effective to project the disc from the holder into engagement with receiving lugs on the conveyor carrier components, flexible means sustained by the holder to retain the successive discs in engagement with the carrier receiving lugs, guide means confining the conveyor to parallel progression in respect to the disc ejector and holder, a floating member adapted to restrain the conveyor carriers against misalignment, a pivotal member movable by a projection from each conveyor carrier to actuate means controlling the flow of pressure medium from the conductive means aforesaid, a buffer device coactive with the carrier upper edges to resist the impact effect of the pressure medium flows, actuator means operatively coordinating the bridge piece of the slide bars with the conveyor progressing means, and means whereby said actuator may be held out of operation.

6. A container and feed mechanism for discs as defined in claim 5 wherein the foot structure comprises a base with spaced side walls having opposed edges inclined to the vertical and longitudinally grooved inward thereof, a horizontal groove in the lower inner face of each said wall, an intervening plate member, engageable in the base side wall inclined grooves, said plate member embodying flanking flange portions coactive with the side wall horizontal grooves, spring-influenced rectangular section wear bars seated in complemental section grooves in the outer face of the plate member, positioning pins firmly secured in said wear bars to engage through holes in the plate member, and spring-influenced pusher to coact with the outer ends of said pins to normally urge the latter and associated wear bars forwardly.

7. A container and feed mechanism for sectorally notched discs as defined in claim 5, wherein the fixed and detachable inclined chute sections comprise annularly spaced paralleling top, bottom and side bars retained in assembly by end and intermediate attached collars, said top bar having an inwardly directed longitudinal rib for coaction with the disc sectoral notch, the main disc follower is provided with a radial hook, a flexible cord connects at one end to the hook and coacts with freely rotative sheaves supported by the chute fixed section, and a weight is attached to the other end of said cord to maintain the follower in forwardly urging contact with the outermost disc in the chute.

8. A container and feed mechanism for sectorally notched discs as defined in claim 5, wherein the chute comprises annularly spaced paralleling top, bottom and side bars retained in assembly by attached end collars, the auxiliary disc follower consists of an appropriately sectioned block for slidable coaction between an adjacent pair of the bars aforesaid, a flexible cord is attached at one end to the follower and is trained around freely rotative sheaves carried by the end collars with a weight at its free end, a slide in said block movable radially inward of the chute for engagement on the outermost disc, and a snap device coacts with a recess in the slide for holding the latter in active position.

9. A container and feed mechanism for sectorally notched discs as defined in claim 5 wherein the ejector plate has an arcual cut-out and a central tongue for respective joint coaction with the disc circumferential edge and sectoral notch during ejection of consecutive discs from the container.

10. A container and feed mechanism for sectorally notched discs as defined in claim 5, wherein the ejected disc receiver and holder is in the form of a longitudinally ribbed bar, said bar having a cut-out for central alignment below the ejector plate with an associated interruption through the bar rib, an inclined recess in advance of the bar cut-out flanks the same sidewise with formation of disc supporting sectoral edges, and an undulate spring strip at the forward side of the inclined recess holds the disc therein against rotary displacement.

11. A container and feed mechanism for sectorally notched discs as defined in claim 5, wherein the holder for the disc, after release by the ejector plate, is further characterized by parallel flexible wires functional to hold the disc, after projection from the holder by the pressure means, firmly against the conveyor vertical component receiving lugs.

12. A container and feed mechanism for sectorally notched discs as defined in claim 5, wherein the pressure medium conductive means comprises a vertically collapsed nozzle which seats in the holder notch, a suitable valve controls discharge of the pressure medium from such nozzle, and switch means including a spring-influenced trip device coacts with spaced projections from the conveyor carrier components, to intermittently actuate the valve aforesaid.

13. A container and feed mechanism for sectorally notched discs as defined in claim 5, wherein the means confining the conveyor to parallel progression with respect to the disc ejector and holder comprise an angled thrust device, said device embodying a horizontal and vertical portions with the former movable in fixed guides, parallel projections laterally extend from the vertical portion of said device in coactive confronting relation to the conveyor components, and spring means influence the device towards the conveyor carrier components.

14. A container and feed mechanism for sectorally notched discs as defined in claim 5, wherein the buffer device, coactive with the conveyor carrier component upper edges, comprises a bar fixed to the foot structure, said bar having spaced holes housing coil springs, a buffer member parallels the bar with studs passed into the coil springs, and a flexible adjuster member abuts the outer ends of the coil springs with an attaching means engaged in the fixed bar aforesaid.

15. A container and feed mechanism for sectorally notched discs as defined in claim 5, wherein the actuator means comprises a rigid fulcrum bracket, an actuator lever pivoted to said bracket intermediate the ends of said lever, a recoil spring having one extremity connected to one end of the actuator lever and the other coupled to a stationary anchorage, an angularly adjustable pawling element is carried by the actuator lever intermediate the pivot of the latter and the recoil spring, an antifriction roller at the free end of the pawling element coacts with a suitable tooth cam fast on the proximate driven shaft of the conveyor, a pivotal connection between the other end of the actuator and the disc ejector plate slide bars; and means whereby the pawling element may be supported out of coaction with the tooth cam.

CHARLES C. SCHAEFER.
SOREN A. TOLLEFSON.
HERMAN F. NIED.